United States Patent
Butler et al.

(10) Patent No.: US 11,074,788 B2
(45) Date of Patent: Jul. 27, 2021

(54) ELECTRONIC GAME ARRANGEMENT

(71) Applicant: Abacus Solutions International IP B.V., Landsmeer (NL)

(72) Inventors: Simon Butler, Landsmeer (NL); Alex Burstein, Landsmeer (NL); Nick Green, Landsmeer (NL)

(73) Assignee: ABACUS SOLUTIONS INTERNATIONAL IP B.V., Landsmeer (NL)

( * ) Notice: Subject to any disclaimer, the term of this patent is extended or adjusted under 35 U.S.C. 154(b) by 603 days.

(21) Appl. No.: 14/733,407

(22) Filed: Jun. 8, 2015

(65) Prior Publication Data
US 2016/0217643 A1    Jul. 28, 2016

(51) Int. Cl.
*G07F 17/32* (2006.01)
*A63F 13/40* (2014.01)
*A63F 13/792* (2014.01)
*A63F 3/08* (2006.01)
*A63F 9/24* (2006.01)
*G07C 15/00* (2006.01)

(52) U.S. Cl.
CPC ............ *G07F 17/329* (2013.01); *A63F 3/081* (2013.01); *A63F 9/24* (2013.01); *A63F 13/40* (2014.09); *A63F 13/792* (2014.09); *G07C 15/006* (2013.01); *G07F 17/323* (2013.01); *G07F 17/3246* (2013.01); *A63F 2003/088* (2013.01)

(58) Field of Classification Search
None
See application file for complete search history.

(56) References Cited

U.S. PATENT DOCUMENTS

| 4,157,829 A | * | 6/1979 | Goldman | ................ A63F 3/08 463/17 |
| 2003/0087683 A1 | * | 5/2003 | Gatto | ................ G06Q 50/34 463/6 |

(Continued)

FOREIGN PATENT DOCUMENTS

| WO | 97/38399 | 10/1997 |
| WO | WO 2005/006267 A1 | 1/2005 |

(Continued)

*Primary Examiner* — Jason T Yen
(74) *Attorney, Agent, or Firm* — Leydig, Voit & Mayer, Ltd.

(57) ABSTRACT

A method is proposed for processing a game participation request. The method comprises receiving, from a terminal, a participation request comprising a prize amount indication and based on the prize amount, determining a winning criterion for a random number to meet for the game participation request to yield a winning participation. The method further comprises receiving a random number from a number generator, determining whether the number meets the winning criterion and communicating a message that the participation is a winning participation if the random number meets the criterion. With a prize amount a priori unknown by a game server as the electronic gaming arrangement, it is advantageous to relate winning for to the specific prize amount. In order to remain profitable, it is preferred to attribute lower winning chances for higher prize amounts. This is enabled by relating the winning criterion to the prize amount communicated to the server.

15 Claims, 3 Drawing Sheets

(56) References Cited

U.S. PATENT DOCUMENTS

| | | | | |
|---|---|---|---|---|
| 2004/0116178 A1* | 6/2004 | Okada | ................. | G07F 17/3211 |
| | | | | 463/20 |
| 2004/0204231 A1* | 10/2004 | Martin | ................... | G07F 17/32 |
| | | | | 463/25 |
| 2005/0159213 A1* | 7/2005 | Okada | ................... | G06Q 20/04 |
| | | | | 463/25 |
| 2008/0026811 A1* | 1/2008 | White | ................... | G07F 17/32 |
| | | | | 463/17 |
| 2008/0176628 A1* | 7/2008 | Okada | ................ | G07F 17/3202 |
| | | | | 463/20 |
| 2010/0069136 A1* | 3/2010 | Safaei | .................... | G07F 17/32 |
| | | | | 463/17 |
| 2011/0281637 A1* | 11/2011 | Meyer | .................. | G07F 17/329 |
| | | | | 463/22 |

FOREIGN PATENT DOCUMENTS

| | | |
|---|---|---|
| WO | 2005/082477 | 9/2005 |
| WO | 2013/027045 | 2/2013 |

* cited by examiner

ELECTRONIC GAME ARRANGEMENT

TECHNICAL FIELD

The various aspects relate to an electronic game arrangement, a method of operating an electronic game arrangement, a terminal for communicating with the electronic game arrangement and a method of operating the terminal.

BACKGROUND

Lotteries are known services provided by lottery operators. Lottery tickets may be provided as paper ticket with a specific number. The number may be pre-determined, selected by a customer or generated on the fly. Providing such lottery tickets through a point of sale terminal makes the sale of the known lottery tickets more convenient.

SUMMARY

The known methods of providing a lottery ticket via a point of sale terminal only provide a standard lottery ticket, with one or more pre-determined numbers or a number generated on the fly. It is therefore preferred to dispose of a system and parts thereof that are arranged for providing a different type of lottery game.

A first aspect provides, in an electronic gaming arrangement operatively connectable to a random number generator, a method for processing a game participation request. The method comprises receiving, from a game terminal, a game participation request the game participation request comprising a prize amount indication and based on the prize amount, determining a winning criterion for a random number to meet for the game participation request to yield a winning participation. The method further comprises receiving a random number from the random number generator, determining whether the received random number meets the winning criterion and communicating, to the game terminal, a winning message that the participation is a winning participation if the random number meets the winning criterion.

With a prize amount specified upfront, but a priori unknown by a game server as the electronic gaming arrangement, it is advantageous to relate winning for to the specific prize amount. In order to remain profitable, it is preferred to attribute lower winning chances for higher prize amounts. This is enabled by determining the winning criterion based on the prize amount communicated to the game server.

An embodiment of the first aspect further comprises based on the prize amount, determining a winning chance and wherein the winning criterion is determined on the winning chance.

In relating the winning to the specific prize amount, it is particularly advantageous to couple the winning chance in particular to the prize amount to be profitable.

Another embodiment of the first aspect comprises retrieving a pre-determined prize criterion per unity prize amount; and, based on the pre-determined prize criterion and the prize amount indication, determining the winning criterion.

This embodiment allows for quickly determining the winning criterion and/or the winning chance, based on the prize amount and reference data like a pre-determined prize criterion per unity prize amount.

A further embodiment of the first aspect comprises, if the random number meets the winning criterion, communicating to a banking server an instruction message comprising an instruction for paying the prize amount to a pre-determined party.

This embodiment allows for automated processing of payment of the winning amount.

A second aspect provides, in payment terminal, a method of communicating a game participation request to an electronic gaming arrangement. The method comprises receiving a transaction amount related to transaction in exchange for goods or services, receiving an instruction for sending the game participation request and in response to receiving the instruction for sending the game participation request, sending the game participation request, the game participation request comprising the transaction amount as the prize amount.

Such payment terminal is well suitable to communicate with the electronic gaming arrangement according to the first aspect. By using the payment terminal for sending our the game participation request, a device is used for sending out the request that is per definition already aware of an amount to be paid in exchange of goods and services.

An embodiment of the first aspect further comprises receiving an instruction for payment of the transaction amount, sending a payment instruction message to a banking server, the payment instruction message comprising the transaction amount, a customer identifier for identifying the customer of the goods or service and a merchant identifier for identifying a merchant trading the goods and services, receiving, from the banking server, a confirmation message indicating that the transaction amount has been transferred from the customer to the merchant and sending the game participation request to the electronic gaming arrangement upon receiving the conformation message.

This embodiment ensures that a customer only participates once the amount due has been paid.

A third aspect provides a computer programme product comprising computer executable code enabling a computer programmed with the computer executable code to perform the method according to the first aspect.

A fourth aspect provides a computer programme product comprising computer executable code enabling a computer programmed with the computer executable code to perform the method according to the second aspect.

A fifth aspect provides an electronic gaming arrangement comprising a communication module arranged to receive, from a game terminal, a game participation request the game participation request comprising a prize amount indication and receive a random number from the random number generator. The electronic gaming arrangement further comprises a processing unit arranged to, based on the prize amount, determine a winning criterion for a random number to meet for the game participation request to yield a winning participation and determine whether the received random number meets the winning criterion. In the electronic gaming arrangement, the communication module is further arranged to communicate, to the game terminal, a winning message that the participation is a winning participation if the random number meets the winning criterion.

A sixth aspect provides a payment terminal comprising a communication module arranged to receive a transaction amount related to transaction in exchange for goods or services and an input module arranged to receive an instruction for sending a game participation request. The payment terminal further comprises a processing module arranged to generate a game participation request, the game participation request comprising the transaction amount as the prize amount. In the payment terminal, the communication module is further arranged to, in response to receiving the instruction for sending the game participation request, send the game participation request.

BRIEF DESCRIPTION OF THE DRAWINGS

The various aspects and embodiment thereof will now be discussed in further detail in conjunction with Figures. In the Figures.

DETAILED DESCRIPTION

Figure 1:
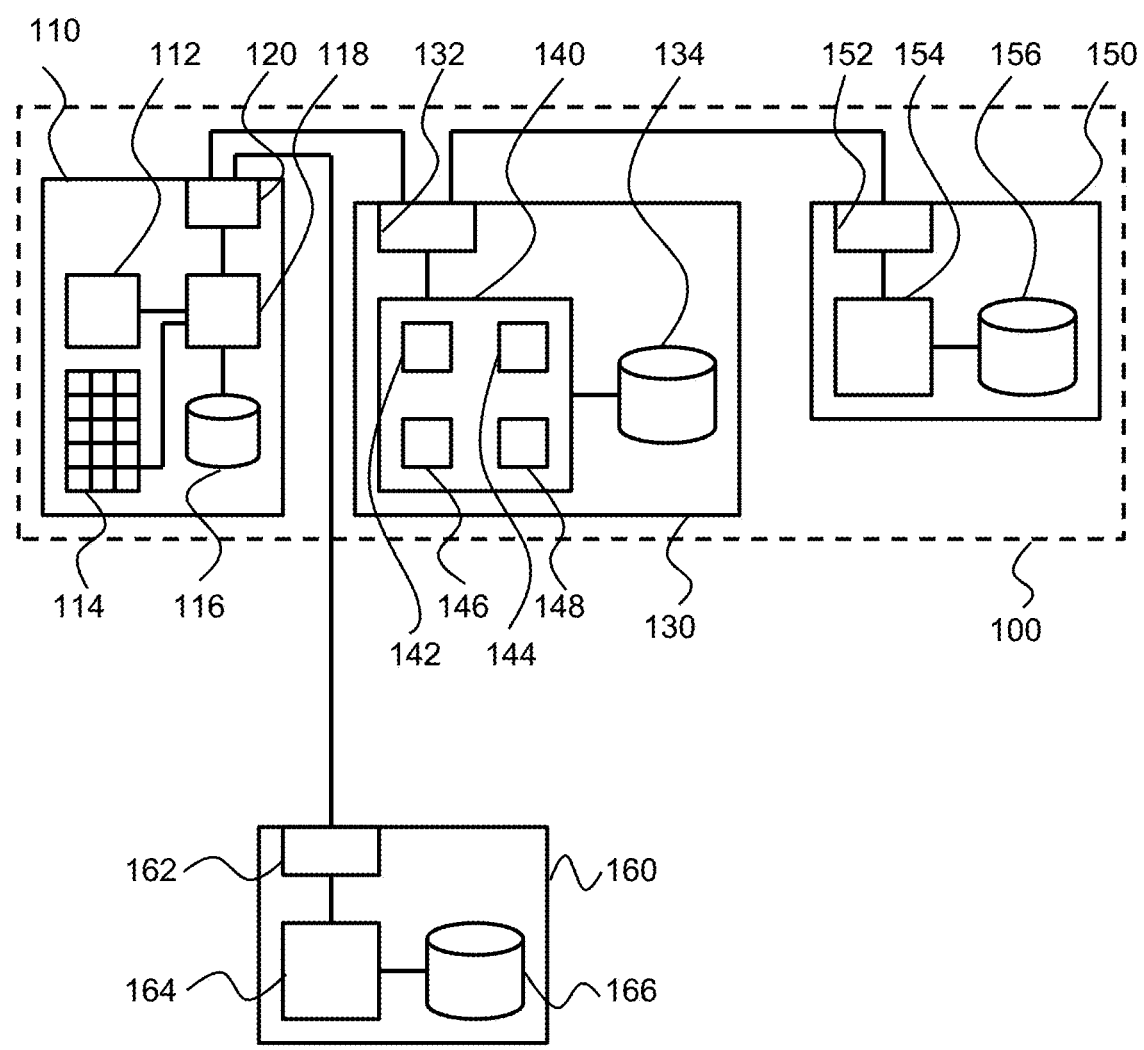
FIG. 1 shows a computer game system and a banking server.

FIG. 1 shows a computer game system 100. The computer game system 100 comprises a payment terminal 110, a game server 130, a random number generator server 150. FIG. 1 also shows a banking server 160 connected to the payment terminal 110.

The payment terminal 110 comprises a keypad 114 as input module, a screen 112 as display module, a terminal microprocessor 118 as a processing unit, a terminal solid state memory 116 as a memory module and a terminal communication unit 120 as a communication module. The screen 112 may be embodied as a touch screen, enabling the screen 112 as an input module as well. The terminal solid state memory 116 is used for storing data received and processed data. The terminal solid state memory 116 is also used for storing computer executable code enabling the payment terminal 110 and the terminal microprocessor 118 in particular to carry out various methods below and variations thereof.

The terminal communication module 120 may be arranged to communicate over a wired or wireless communication link or a combination thereof with the game server 130 and the banking server 160. The communication may be via a direct link or via intermediate networks, like a local area network provided in an establishment run by a merchant employing the payment terminal 110. The terminal communication module 120 may also be arranged to communicate with other devices, local or remote. The terminal communication module 120 may comprise a cellular communication transceiver, a WiFi communication transceiver, an Ethernet transceiver and socket, a USB transceiver and socket, an NFC transceiver, one or more dedicated antenna's, other, or a combination thereof.

The game server 130 comprises a server communication module 132, a server microprocessor 140 as a processing unit and a server memory module 134 that is in this embodiment embodied has a hard disk drive, whereas other options like a solid state memory may be envisaged as well. The server microprocessor 140 comprises various sub-units of which functionality will be explained below. The sub-units may be hardwired during manufacturing, created by means of hard fusing before being taking into use or by means of programming the server microprocessor 140. The programming is done by means of computer readable code, enabling the server microprocessor to carry out various methods discussed below and variations thereof. The computer executable code may be stored in the server memory module 134.

The server communication module 132 is arranged to communicate with the terminal communication module 120 of the payment terminal 110 and with the random number generator server 150. The communication with the other arrangements may be by means of wired communication links, wireless communication links, or a combination thereof. The communication may be provided via a direct link or via one or more routers, switches and similar equipment. The communication may be handled through open networks, closed networks, or a combination thereof. The communication may be via a wide area network, a local area network, or a combination thereof. The communication may be via a virtual private network, fully, or partially. Preferably, all data traffic between the various arrangements is encrypted.

The random number generator server 150 comprises a number generator communication module 152 for communicating with the server communication module 132 of the game server 130. The communication may be over various types of networks, as discussed above. The random number generator 150 further comprises a random number microprocessor 154 as a randomiser module for providing a random number and a random number memory module 156. The random number microprocessor 154 is arranged to issue a random number on request. The random number may be an integer. Alternatively, the random number is a floating point number of a specific length with a value between 0 and 1, optionally also including 1 and 0. Other formats of the random number may be envisaged as well. In the embodiment shown here, the randomiser module is incorporated in a separate server. This makes it possible to have the game server 130 and the random number generator to be maintained and supervised by separate entities for security and/or regulatory reasons. In another embodiment, the randomiser module is incorporated in the game server 130.

The banking server 160 is arranged to receive and execute payment instructions issued and confirmed by the payment terminal 110 and a user thereof. The banking server 160 may communicate directly with the payment terminal 110 via the banking communication module 162, connected to the banking microprocessor. Alternatively, another party like an acquirer is position between the banking server and the payment terminal.

Figure 2:
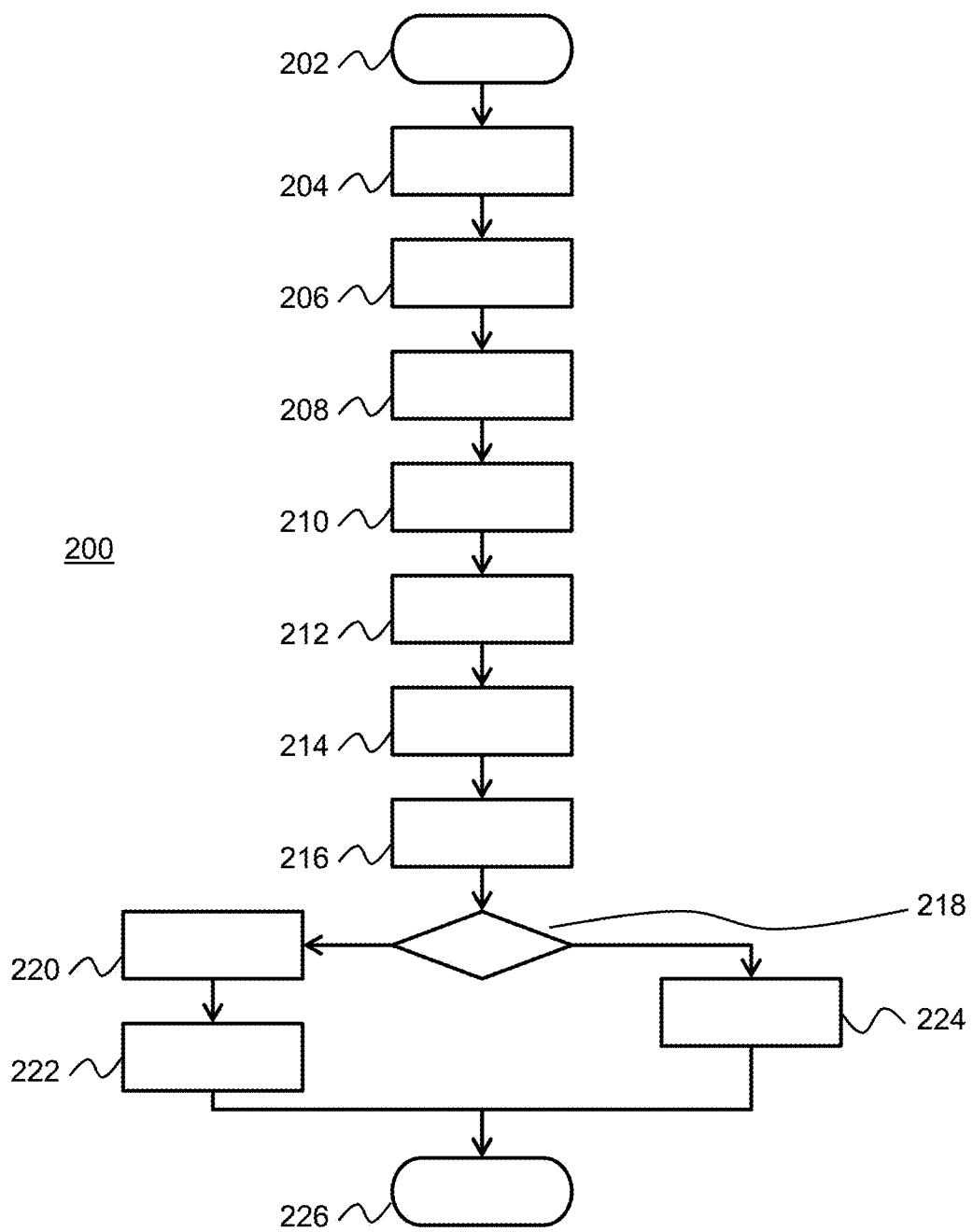
FIG. 2 shows a first flowchart depicting a procedure that may be executed by a game server.

FIG. 2 shows a flowchart 200 depicting a procedure executed by the game server 130. The list below provides a summary of the steps of the flowchart 200.

| | |
|---|---|
| 202 | start procedure |
| 204 | receive game request |
| 206 | retrieve reference data |
| 208 | determine winning chance |
| 210 | determine winning criterion |
| 212 | request random number |
| 214 | receive random number |
| 216 | compare random number with winning criterion |
| 218 | test win or lose |
| 220 | send winning message |
| 222 | instruct payment |
| 224 | send losing message |
| 226 | procedure end |

The procedure starts in a terminal 202 in which the game server 130 and the server microprocessor 140 in particular is initialised. Subsequently, a request message for entering the game is received from the payment terminal 110 in step 204. The request message comprises a game request for entering the game, an identifier of an entity that has sent the request message and a prize amount. Optionally, the request message comprises a bank account number to which the prize amount is to be transferred in case of a winning entry. In step 206, reference data is retrieved. The reference data is preferably stored in the server memory module 134. The reference data indicates a winning chance per unit of prize amount.

In some lotteries, a prize of a pre-determined amount is coupled to one or more lottery tickets and the winning depends on a ticket number satisfying a specific criterion. For higher prize amounts, the odds of winning are lower than for lower prize amounts. Alternatively, in an instant win game, the prize amount is fixed as well and winning depends on outcome of a random event, with a pre-determined chance of winning. In both these cases, the prize amount is a given item and known a priori to a lottery operator.

For a lottery operator to be profitable, it is advantageous to provide chances of winning that are lower for higher amounts of a prize. With the prize amount not being known in advance and varying prize amounts given in different requests messages, the chances of winning are advantageously determined per game request. And as the prize amount is known upfront, the chance of winning needs to be determined on the fly. With a winning chance per unit of prize amount that may be used for further calculation of determining a winning chance for a specific game request, this issue may be resolved.

To this end, winning chance for a game request is determined by dividing the winning chance per unit of the prize amount by the prize amount provided in the request message in step 208. This is done by a winning chance determining sub-unit 142 of the server microprocessor 140. If the chance of winning one Euro would be 50%, the chance of winning 100 Euros would be 5%. Alternatively, the winning chance is further reduced if the amount is higher. This may, for example, be established by dividing the winning chance per unit of prize amount by the square of the prize amount provided in the request. Other methods of determining the winning chance may be envisaged as well.

With the winning chance for the specific prize amount provided in the request message having been obtained, a criterion for deciding whether the game request yields a winning entry is determined in step 210. This is done by a criterion determining sub-unit 144 of the server microprocessor 140. The criterion depends on the winning chance determined in step 208 and a format of a random number requested and received in this procedure. If a random number is provided as a number between 0 and 1 and the winning chance is 20%, the criterion may be set as the random number being equal or below 0.2. The criterion may also be that the random number received is below 0.2. Alternatively, the criterion may be that the random number is equal to or higher than 0.8 or higher than 0.8. In yet another alternative, the criterion is that the number received is between 0.35 and 0.55, where 0.35 and 0.55 may or may not be included in that interval. If the format of the random number would be between 0 and 100 and the winning chance determined earlier would be 40%, winning may be determined if the random number is 40 or lower. And numerous variations may be possible as well.

Subsequently, in step 212, a random number is requested to the random number generator server 150. The random number may be generated on the fly by means of random number microprocessor 154. Alternatively, the random number generator server 150 has multiple random numbers stored in the random number memory module 156 that may be retrieved upon request. Upon generation or retrieval of a random number, the random number generator server 150 is sent to the game server 130. The game server 130 receives the random number in step 214 by means of the server communication module 132.

In step 216, the random number received is compared with the winning criterion determined in step 210. This is done by a comparison sub-unit 146 of the server microprocessor 140. With the comparison, it is decided in decision 218 whether the game request is a winning entry or not by determining whether the random number received matches the winning criterion. This is performed by a winning determination sub-unit 148 of the server microprocessor 140. If the outcome of the decision is that the game entry is a winning entry, the procedure branches to the left to step 220. In step 220, a winning message is sent to the payment terminal 110 indicating the game request resulted in winning the prize amount indicated in the request message.

Subsequently, the prize amount may be transferred to a bank account specified in the request message. Alternatively, a bank account is looked up in a database stored on the server memory module 134 by means of the identifier of an entity that has sent the request message. Instruction to transfer the prize amount or the actual step of transferring the prize amount may be performed in step 222. This instruction may be generated by the server microprocessor and sent out by the server communication module 132. Alternatively, the instruction may be sent out by the terminal microprocessor 118 and sent out by the terminal communication unit 120. The instruction is preferably sent to the banking server 160 over an operative connection between the banking server 160 on one hand and the payment terminal 110 or the game server 130 on the other hand. Subsequently, the procedure ends in terminator 226.

If the winning determination sub-unit 148 of the server microprocessor 140 determines the random number does not satisfy the criterion for winning, the procedure branches in decision 218 to the right and proceeds to step 224. In step 224, a losing message is sent to the payment terminal 110 indicating the game request did not result in winning the prize amount indicated in the request message. Subsequently, the procedure ends in terminator 226.

Figure 3:
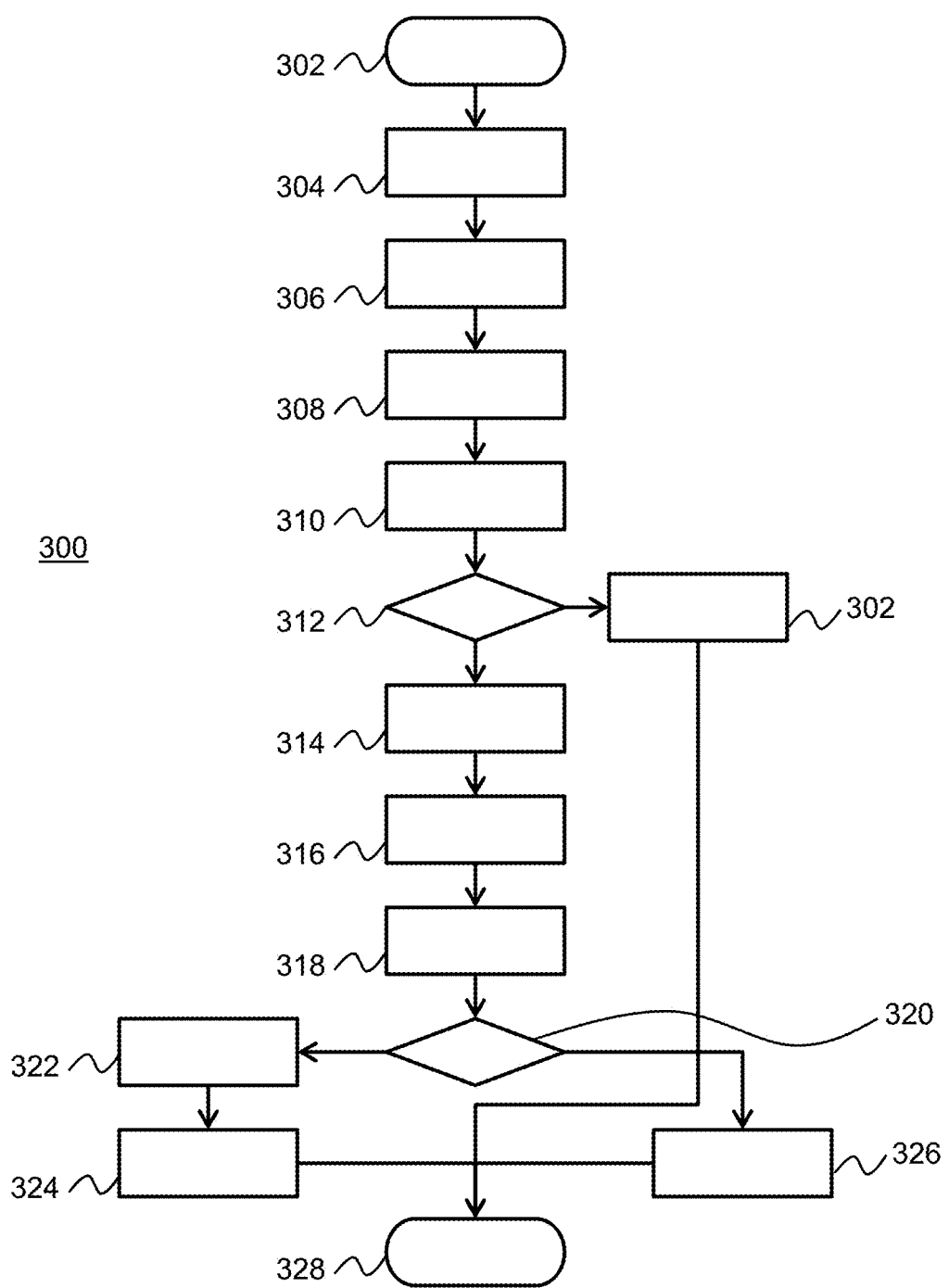
FIG. 3 shows a second flowchart depicting a procedure that may be executed by a payment terminal.

FIG. 3 shows a flowchart 300 depicting a procedure executed by the payment terminal 110. The list below provides a summary of the steps of the flowchart 300.

| | |
|---|---|
| 302 | receive amount payable to merchant |
| 304 | propose participation in game |
| 306 | receive participation confirmation |
| 308 | send payment instruction |
| 310 | receive payment result message |
| 312 | payment successful? |
| 314 | generate request message |
| 316 | send request message |
| 318 | receive result message |
| 320 | determine outcome |
| 322 | display winning message |
| 324 | instruct payment |
| 326 | display non-winning message |
| 328 | end of procedure |

The procedure starts in a terminal 302 in which the payment terminal 110 and the terminal microprocessor 118 in particular is initialized. Subsequently, the procedure continues to step 302 in which the payment terminal 110 receives an amount for settlement. This amount would be for settlement of purchase, renting or other of goods and/or services and would be paid by a customer to a merchant. This amount may be received via the keypad 114 or the touch screen 112. Alternatively, other input means may be envisaged as well, like the terminal communication unit 120 that may comprise an NFC communication unit. Having received the amount, the payment terminal 110 proposes in step 304 on the screen 112 to the customer to participate in a game for winning a prize amount. In a specific embodiment, the prize amount to be won is the amount for settlement of the purchase.

In step 306, confirmation is received from the customer through input means discussed above. A new settlement amount may be determined, being the original settlement amount for the goods and services, plus a game amount to be paid for participating in the game. In step 308, a payment instruction is generated for instructing the banking server 160 to transfer the settlement amount determined to an account of the merchant. In step 310, a payment result message is received by the payment terminal 110. The payment result message indicates whether the settlement amount has been successfully transferred to the bank account of the merchant. Alternatively, the payment results message indicates whether payment of the settlement amount can be executed. In decision 312, it is determined whether the information in the payment result message indicates that the payment was successful or not. If the payment was not successful, the process branches off to terminator 328 in which the procedure ends.

If the payment was successful, the procedure continues to step 314 in which a request message is generated. The request message comprises a game request for entering the game, an identifier of an entity that has sent the request message, related to the merchant, and a prize amount. Optionally, the request message comprises a bank account number to which the prize amount is to be transferred in case of a winning entry. The latter may be a bank account of either the merchant or the customer. The bank account number of the merchant may be pre-programmed in the terminal 110. The bank account number of the customer may be derived from a bank card provided by the customer by means of a chip embedded on the card, in a contacted or contactless way by means of NFC. Alternatively, the customer may provide a bank account number by means of the keypad 114.

The request message thus generated is sent to the game server 130 in step 316 by means of the terminal communication unit 120. In step 318, a result message is received from the game server 130. The result message may indicate either a losing entry or a winning entry. In decision 320, it is determined and decided whether the information in the result message indicates a winning entry or a non-winning entry. If the entry is a winning entry, the procedure branches to step 322. In step 322, a message is displayed on the screen 112 indicating that the customer has won the prize amount specified before. Subsequently, in a step 324, the payment terminal 110 may generate and send out an instruction for payment of the prize amount won to a bank account of the customer. Alternatively, the generation and sending of the instruction is performed by the game server 130. Subsequently, the procedure ends in the terminator 328. If the message is decided to be a non-winning entry, a message is displayed on the screen 112 indicating that the customer has not won. Subsequently, the procedure ends in the terminator 328.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

In the description above, it will be understood that when an element such as layer, region or substrate is referred to as being "on", "onto" or "connected to" another element, the element is either directly on or connected to the other element, or intervening elements may also be present.

Furthermore, the invention may also be embodied with less components than provided in the embodiments described here, wherein one component carries out multiple functions. Just as well may the invention be embodied using more elements than depicted in FIG. 1, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A method carried out on an arrangement including an electronic gaming arrangement operatively connectable to a random number generator, the method comprising:
   the electronic gaming arrangement carrying out a portion of the method comprising the operations of:
      receiving, from a terminal, a game participation request comprising a prize amount indication;
      receiving a random number from the random number generator;
      determining a winning chance based on a prize amount indicated by the prize amount indication;
      determining, based on the winning chance, a winning criterion for a random number to meet for the game participation request to yield a winning participation;
      determining the received random number meets the winning criterion; and
      communicating, to the terminal, a winning message that the participation is a winning participation in accordance with the determining the received random number meets the winning criterion,
   wherein the arrangement further comprises a payment terminal, and
   wherein the payment terminal carries out a portion of the method comprising the operations of:
      receiving, by a communication module, the transaction amount;
      receiving, by an input module, an instruction for sending the game participation request; and
      generating, by a processing module arranged to generate the game participation request, the game participation request comprising the transaction amount as the prize amount: and
      sending, by the communication module in response to receiving the instruction for sending the game participation request, the game participation request to the electronic gaming arrangement.

2. The method according to claim 1, further comprising:
   retrieving a pre-determined prize criterion per unity prize amount; and
   wherein the determining the winning criterion is based on:
      the pre-determined prize criterion per unity prize amount, and
      the prize amount indication.

3. The method according to claim 1, wherein the random number received from the random number generator is defined as a number within a pre-determined interval and the winning criterion is at least one of the group consisting of:
the random number received is below a first pre-determined threshold value;
the random number received equals a second pre-determined threshold value; and
the random number received is above a third pre-determined value.

4. The method according to claim 1, wherein the random number is received in a pre-determined format, and
wherein the determining a winning criterion is also based on the predetermined format.

5. The method according to claim 1, further comprising, if the random number meets the winning criterion, communicating to a banking server an instruction message comprising an instruction for paying the prize amount to a pre-determined party.

6. The method according to claim 5, wherein the game terminal is operated by a merchant for enabling a customer to communicate the game participation request to the electronic gaming arrangement and wherein the pre-determined party is the merchant.

7. A non-transitory computer-readable medium comprising computer executable code that, when executed by an arrangement including an electronic gaming arrangement operatively connectable to a random number generator, facilitate carrying out a method_comprising:
the electronic gaming arrangement carrying out a portion of the method comprising the operations of: receiving, from a terminal, a game participation request comprising a prize amount indication;
receiving a random number from the random number generator operatively connectable to the computer;
determining a winning chance based on a prize amount indicated by the prize amount indication;
determining, based on the winning chance, a winning criterion for a random number to meet for the game participation request to yield a winning participation;
determining the received random number meets the winning criterion; and
communicating, to the terminal, a winning message that the participation is a winning participation in accordance with the determining received the random number meets the winning criterion,
wherein the arrangement further comprises a payment terminal, and
wherein the payment terminal carries out a portion of the method comprising the operations of:
receiving, by a communication module, the transaction amount;
receiving, by an input module, an instruction for sending the game participation request; and
generating, by a processing module arranged to generate the game participation request, the game participation request comprising the transaction amount as the prize amount; and
sending, by the communication module in response to receiving the instruction for sending the game participation request, the game participation request to the electronic gaming arrangement.

8. The non-transitory computer-readable medium of claim 7, wherein the random number received from the random number generator is defined as a number within a pre-determined interval and the winning criterion is at least one of the group consisting of:
the random number received is below a first pre-determined threshold value;
the random number received equals a second pre-determined threshold value; and
the random number received is above a third pre-determined value.

9. The non-transitory computer-readable medium of claim 7, wherein the random number is received in a pre-determined format, and
wherein the determining a winning criterion is also based on the predetermined format.

10. The non-transitory computer-readable medium of claim 7, further comprising, if the random number meets the winning criterion, communicating to a banking server an instruction message comprising an instruction for paying the prize amount to a pre-determined party.

11. An arrangement comprising:
an electronic gaming arrangement operatively connectable to a random number generator and configured to carry out a second portion of a method, the electronic gaming arrangement comprising a second processing unit and a non-transitory computer-readable medium including computer-executable instructions that, when executed by the processing unit, facilitate carrying out a gaming method comprising the operations of: receiving, from a terminal, a game participation request comprising a prize amount indication; receiving a random number from the random number generator; determining a winning chance based on a prize amount indicated by the prize amount indication; determining, based on the winning chance, a winning criterion for a random number to meet for the game participation request to yield a winning participation; determining the received random number meets the winning criterion; and communicating, to the terminal, a winning message that the participation is a winning participation in accordance with the determining the received random number meets the winning criterion,
wherein the arrangement further comprises a payment terminal, wherein the payment terminal is configured to carry out a first portion of the method, and wherein the payment terminal comprises a first processing unit and a first non-transitory computer-readable medium including computer-executable instructions that, when executed by the first processing unit, facilitate carrying out the first portion of the method comprising the operations of:
receiving, by a communication module, the transaction amount; receiving, by an input module, an instruction for sending the game participation request; and generating, by processing module arranged to generate the game participation request, the game participation request comprising the transaction amount as the prize amount; and sending, by the communication module in response to receiving the instruction for sending the game participation request, the game participation request to the electronic gaming arrangement.

12. The electronic gaming arrangement according to claim 11, further comprising the random number generator.

13. The electronic gaming arrangement according to claim 11, wherein the random number received from the random number generator is defined as a number within a pre-determined interval and the winning criterion is at least one of the group consisting of:
the random number received is below a first pre-determined threshold value;

the random number received equals a second pre-determined threshold value; and the random number received is above a third pre-determined value.

14. The electronic gaming arrangement according to claim 11, wherein the random number is received in a pre-determined format, and wherein the determining a winning criterion is also based on the predetermined format.

15. The electronic gaming arrangement according to claim 11, further comprising, if the random number meets the winning criterion, communicating to a banking server an instruction message comprising an instruction for paying the prize amount to a pre-determined party.

\* \* \* \* \*